United States Patent
Fluhr et al.

(10) Patent No.: US 7,143,267 B2
(45) Date of Patent: Nov. 28, 2006

(54) PARTITIONING PREFETCH REGISTERS TO PREVENT AT LEAST IN PART INCONSISTENT PREFETCH INFORMATION FROM BEING STORED IN A PREFETCH REGISTER OF A MULTITHREADING PROCESSOR

(75) Inventors: Eric J. Fluhr, Round Rock, TX (US); Cathy May, Millwood, NY (US); Balaram Sinharoy, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 508 days.

(21) Appl. No.: 10/425,424

(22) Filed: Apr. 28, 2003

(65) Prior Publication Data

US 2004/0215892 A1    Oct. 28, 2004

(51) Int. Cl.
*G06F 9/30* (2006.01)
*G06F 9/40* (2006.01)
*G06F 15/00* (2006.01)
*G06F 7/38* (2006.01)
*G06F 9/00* (2006.01)
*G06F 9/44* (2006.01)

(52) U.S. Cl. .................... 712/207; 712/228; 712/229

(58) Field of Classification Search ............... 712/207, 712/229, 228
See application file for complete search history.

(56) References Cited

U.S. PATENT DOCUMENTS

| 6,052,708 | A | 4/2000 | Flynn et al. ............... 709/108 |
| 6,073,215 | A | 6/2000 | Snyder .................... 711/137 |
| 6,832,296 | B1* | 12/2004 | Hooker .................... 711/137 |
| 2003/0033509 | A1* | 2/2003 | Leibholz et al. ........... 712/228 |

\* cited by examiner

*Primary Examiner*—Fritz Fleming
*Assistant Examiner*—Jesse Moll
(74) *Attorney, Agent, or Firm*—Robert A. Voight, Jr.; Winstead Sechrest & Minick P.C.

(57) ABSTRACT

A method and multithreaded processor for dynamically reallocating prefetch registers upon the processor switching modes of operation. An execution unit may be coupled to a prefetch engine where the execution unit may be configured to receive prefetch instructions regarding prefetching data. The prefetch engine may comprise a plurality of prefetch registers. The execution unit may further be configured to load the plurality of prefetch registers with information regarding prefetching data obtained from the prefetch instructions. In a single thread mode of operation, the plurality of prefetch registers are allocated to be accessed by either a first or a second thread. In a multithread mode of operation, the plurality of prefetch registers are allocated to be accessed among the first and second threads.

8 Claims, 5 Drawing Sheets

PARTITIONING PREFETCH REGISTERS TO PREVENT AT LEAST IN PART INCONSISTENT PREFETCH INFORMATION FROM BEING STORED IN A PREFETCH REGISTER OF A MULTITHREADING PROCESSOR

TECHNICAL FIELD

The present invention relates to the field of multithreading processors, and more particularly to partitioning prefetch registers to prevent at least in part inconsistent prefetch information from being stored in a prefetch register.

BACKGROUND INFORMATION

Modern processors employed in computer systems use various techniques to improve their performance. One of these techniques is commonly referred to as "multithreading." Multithreading allows multiple streams of instructions, commonly referred to as "threads," to be executed. The threads may be independent programs or related execution streams of a single parallel program or both.

Processors may support three types of multithreading. The first is commonly referred to as "coarse-grained" or "block multithreading." Coarse-grained or block multithreading may refer to rapid switching of threads on long-latency operations. The second is commonly referred to as "fine-grained multithreading." Fine-grained multithreading may refer to rapid switching of the threads on a cycle by cycle basis. The third type of multithreading is commonly referred to as "simultaneous multithreading." Simultaneous multithreading may refer to scheduling of instructions from multiple threads within a single cycle.

Modern processors, such as a simultaneous multithreading (SMT) processor, may include a prefetch engine configured to prefetch data from memory, e.g., main memory, prior to the time the data is requested by the processor. The data prefetched from memory, e.g., main memory, may be speculatively prefetched based on the principle that if a memory location is addressed by the processor, the next sequential address will likely be requested by the processor in the near future. The data prefetched may be loaded in a data cache.

The location in main memory as to where to prefetch data may be determined by addresses stored in registers, commonly referred to as "prefetch registers." These prefetch registers may also include information regarding the size and direction of the prefetched data in main memory. The size may refer to the size of the contiguous block of data to be prefetched. The direction may refer to whether the contiguous block of data is to be prefetched from main memory at the address stored in the prefetch register and upwards or is to be prefetched from main memory at the address stored in the prefetch register and downwards.

The information regarding the address, size and direction of the prefetched data may be provided in multiple instructions, referred to herein as "prefetch instructions." One prefetch instruction may provide the address of where to prefetch the data in main memory. Another prefetch instruction may provide the size and direction. Further, these prefetch instructions may specify a particular prefetch register into which to insert the information contained in the instruction. Another prefetch instruction may indicate to the prefetch engine to prefetch the data from main memory using the information provided in a particular prefetch register.

In a multithreading processor, these prefetch instructions may be from multiple threads. If a particular prefetch instruction included information, e.g., address of the prefetched data, from a first thread, e.g., thread $T_0$, to be stored in a particular prefetch register and another prefetch instruction included information, e.g., size and direction of the prefetched data, from a second thread, e.g., thread $T_1$, to be stored in that same particular prefetch register, then undesirable results may occur such as prefetching the wrong data from main memory. That is, inconsistent data may be stored in a prefetch register when prefetch information from multiple threads are stored in the same prefetch register. In particular, a multithreading processor may provide for a single thread mode of operation and multithread mode operation wherein the processor switches to execute instructions from two threads, rather than safely from a single thread. The aforementioned inconsistency may arise when the mode switches because one thread may have put data into a prefetch register and the second thread could include an instruction that puts data into the same register.

Therefore, there is a need in the art to prevent at least in part inconsistent prefetch information from being stored in a prefetch register.

SUMMARY

The problems outlined above may at least in part be solved in some embodiments by partitioning the prefetch registers to be accessed by particular threads. That is, the prefetch registers may be reserved to be accessed by particular threads. Furthermore, the prefetch registers may be dynamically partitioned according to a particular mode of operation, e.g., single thread mode of operation, multithread mode of operation, in order to efficiently use all the resources (prefetch registers) available. For example, if there were eight prefetch registers (PR0–7) in the prefetch engine, then during a single thread mode of operation for thread $T_0$ where the processor executes instructions solely from thread $T_0$, prefetch registers PR0–7 may be allocated for use by thread $T_0$. Further, during a single thread mode of operation for thread $T_1$ where the processor executes instructions solely from thread $T_1$, prefetch registers PR0–7 may be allocated for use by thread $T_1$. Further, during a multithread mode of operation where the processor executes instructions for both threads $T_0$ and $T_1$, prefetch registers PR0–7 may be allocated among both threads. For example, prefetch registers PR0–3 may be allocated to be used by thread $T_0$ and prefetch registers PR4–7 may be allocated to be used by thread $T_1$. If prefetch registers, e.g., prefetch register PR0, become reserved to be used for a particular thread, e.g., thread $T_1$, by the prefetch instructions during a particular mode of operation, then when the processor switches modes of operation, one or more of those reserved registers may have to be dynamically reallocated to be used by another thread, e.g., thread $T_0$. However, since these prefetch registers are reserved to be used by the other thread, e.g., thread $T_1$, the hardware may not be able to reallocate these reserved prefetch registers when the processor switches modes of operation. This problem may be solved, at least in part, by the prefetch engine clearing a field, referred to herein as the "reserved field," used to reserve a prefetch register for a particular thread. By clearing the reserved field, the hardware may be able to load prefetching data from another thread.

In one embodiment of the present invention, a prefetch engine may comprise a plurality of prefetch registers. An execution unit may be coupled to the prefetch engine where the execution unit may be configured to receive prefetch instructions regarding prefetching data. Further, the execution unit may be configured to load the plurality of prefetch registers with information regarding prefetching data obtained from the prefetch instructions. Each of the plurality of prefetch registers may be selectively allocated for use by either a first thread or a second thread while operating in either a single thread mode of operation or a multithread mode of operation.

The foregoing has outlined rather broadly the features and technical advantages of one or more embodiments of the present invention in order that the detailed description of the invention that follows may be better understood. Additional features and advantages of the invention will be described hereinafter which form the subject of the claims of the invention.

BRIEF DESCRIPTION OF THE DRAWINGS

A better understanding of the present invention can be obtained when the following detailed description is considered in conjunction with the following drawings, in which.

DETAILED DESCRIPTION

The present invention comprises a method and multithreaded processor for dynamically reallocating prefetch registers upon switching modes of operation. In one embodiment of the present invention, a prefetch engine may comprise a plurality of prefetch registers. An execution unit may be coupled to the prefetch engine where the execution unit may be configured to receive prefetch instructions regarding prefetching data. The execution unit may be further configured to load the plurality of prefetch registers with information regarding prefetching data obtained from the prefetch instructions. In a single thread mode of operation, the plurality of prefetch registers are allocated to be accessed by either a first or a second thread. In a multithread mode of operation, the plurality of prefetch registers are allocated among the first and second threads.

Although the present invention is described with reference to a simultaneous multithreading processor, it is noted that the principles of the present invention may be applied to any type of multithreading processor, e.g., course grained, fine-grained multithreading, with the capability of multiple modes of operation. It is further noted that a person of ordinary skill in the art would be capable of applying the principles of the present invention as discussed herein to any type of multithreading processor with the capability of multiple modes of operation. It is further noted that embodiments applying the principles of the present invention to any type of multithreading processor with the capability of multiple modes of operation would fall within the scope of the present invention.

In the following description, numerous specific details are set forth to provide a thorough understanding of the present invention. However, it will be apparent to those skilled in the art that the present invention may be practiced without such specific details. In other instances, well-known circuits may be shown in block diagram form in order not to obscure the present invention in unnecessary detail. For the most part, details considering timing, data formats within communication protocols, and the like have been admitted inasmuch as such details are not necessary to obtain a complete understanding of the present invention and are within the skills of persons of ordinary skill in the relevant art.

Figure 1:
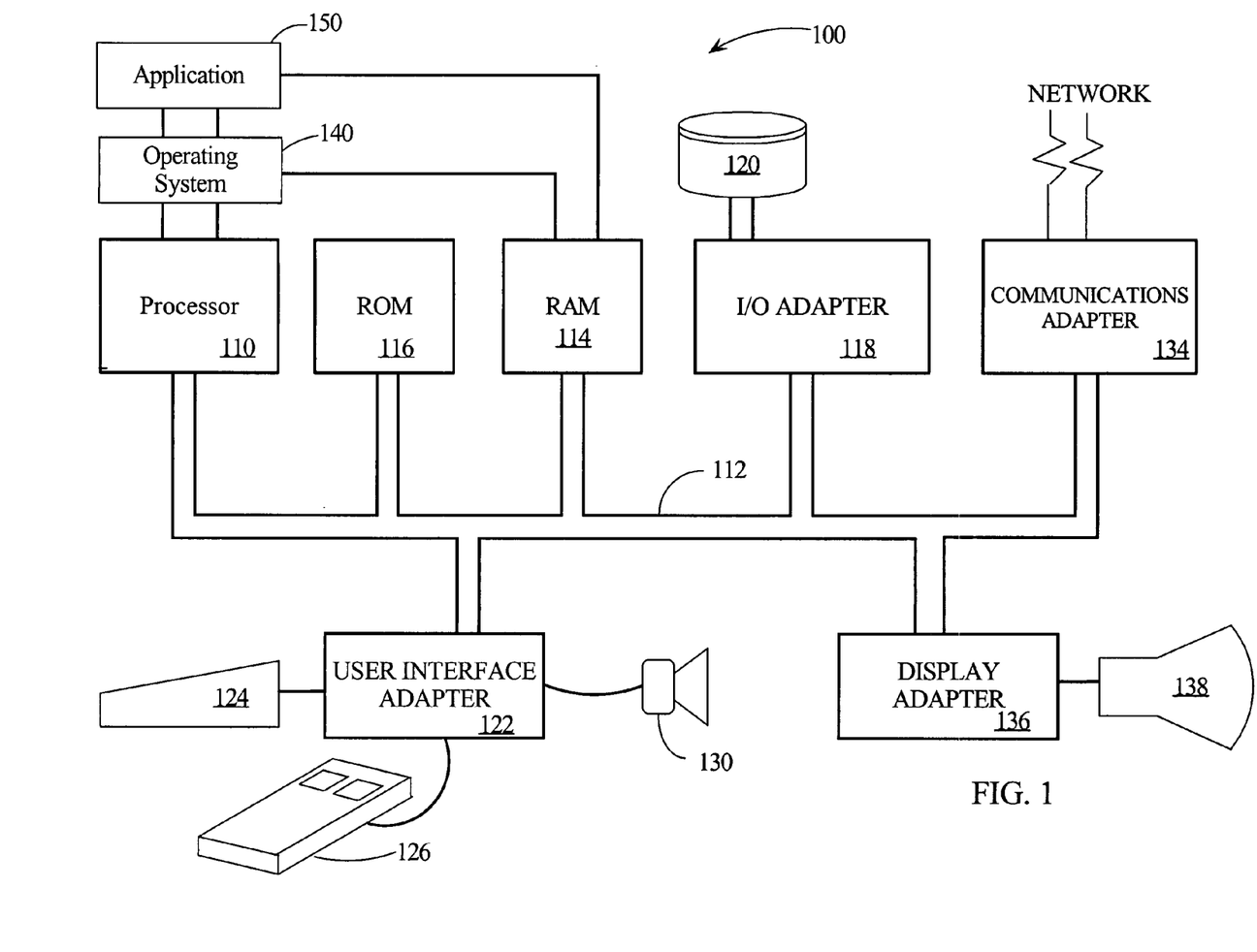
FIG. 1 illustrates an embodiment of the present invention of a computer system.

FIG. 1—Computer System

FIG. 1 illustrates a hardware configuration of computer system 100 which is representative of a hardware environment for practicing the present invention. Computer system 100 may have a processing unit 110 coupled to various other components by system bus 112. Processing unit 110 may be a simultaneous multithreading processor as described in detail below in conjunction with FIG. 2. An operating system 140 may run on processor 110 and provide control and coordinate the functions of the various components of FIG. 1. An application 150 in accordance with the principles of the present invention may run in conjunction with operating system 140 and provide calls to operating system 140 where the calls implement the various functions or services to be performed by application 150. Read-Only Memory (ROM) 116 may be coupled to system bus 112 and include a basic input/output system ("BIOS") that controls certain basic functions of computer system 100. Random access memory (RAM) 114 and disk adapter 118 may also be coupled to system bus 112. It should be noted that software components including operating system 140 and application 150 may be loaded into RAM 114, which may be computer system's 100 main memory for execution. Disk adapter 118 may be an integrated drive electronics ("IDE") adapter that communicates with a disk unit 120, e.g., a disk drive.

Computer system 100 may further comprise a communications adapter 134 coupled to bus 112. Communications adapter 134 may interconnect bus 112 with an outside network enabling computer system 100 to communicate with other such systems. I/O devices may also be connected to system bus 112 via a user interface adapter 122 and a display adapter 136. Keyboard 124, mouse 126 and speaker 130 may all be interconnected to bus 112 through user interface adapter 122. Event data may be inputted to computer system 100 through any of these devices. A display monitor 138 may be connected to system bus 112 by display adapter 136. In this manner, a user is capable of inputting to computer system 100 through keyboard 124 or mouse 126 and receiving output from computer system 100 via display 138.

Figure 2:
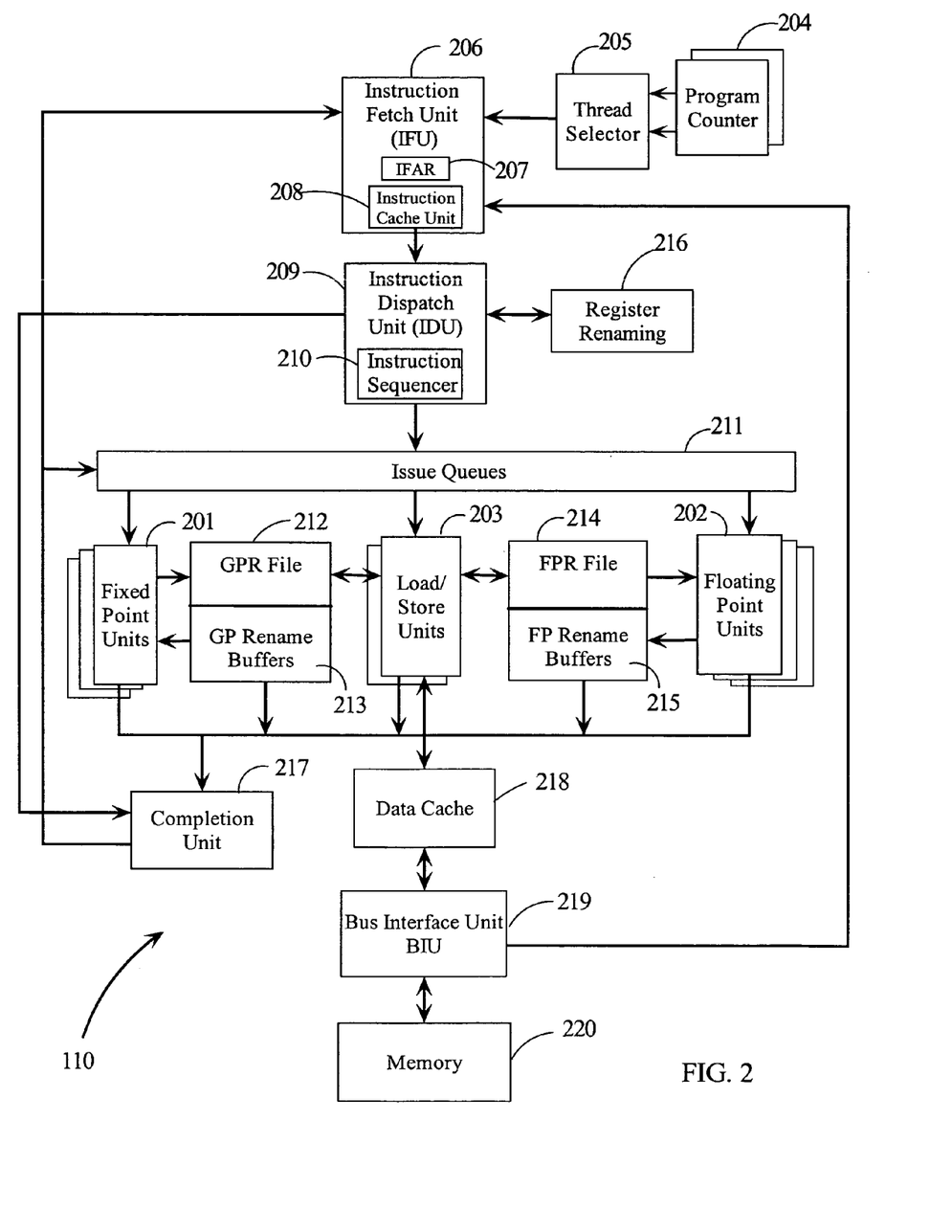
FIG. 2 illustrates an embodiment of the present invention of a simultaneous multithreading processor.

FIG. 2—Simultaneous Multithreading Processor

FIG. 2 illustrates an embodiment of a simultaneous multithreading processor 110. Multithreading processor 110 may be configured to execute multiple instructions per clock cycle. Further, processor 110 may be configured to simultaneously execute instructions from multiple threads as discussed further below. These instructions may be executed in any of the execution units of processor 110 including Fixed Point Units (FXUs) 201, Floating Point Units (FPUs) 202 and Load/Store Units (LSUs) 203 during any one clock cycle. It is noted that processor 110 may comprise other execution units, such as branch execution units, and that processor 110 is not limited in scope to any one particular embodiment. It is further noted that processor 110 may include additional units, registers, buffers, memories, and other sections than illustrated in FIG. 2. Some of the elements described below such as issue queues 211, FXUs 201, FPUs 202, LSUs 203, may be referred to either collectively or individually, e.g., FXUs 201, FXU 201. Although processor 110 is described below as executing instructions from two threads, processor 110 may be configured to execute instructions from any number of threads.

Processor 110 may comprise Program Counters (PCs) 204 that correspond to multiple threads, e.g., thread one, thread two, which have instructions for execution. A thread selector 205 may toggle on each clock cycle to select which thread is to be executed. Upon selection of a particular thread, an Instruction Fetch Unit (IFU) 206 may be configured to load the address of an instruction from PCs 204 into Instruction Fetch Address Register 207. The address retrieved from PCs 204 may be an effective address representing an address from the program or compiler. The instruction corresponding to the received effective address may be accessed from Instruction Cache (I-Cache) unit 208 comprising an instruction cache (not shown) and a prefetch buffer (not shown). The instruction cache and prefetch buffer may both be configured to store instructions. Instructions may be inputted to instruction cache and prefetch buffer from a system memory 220 through a Bus Interface Unit (BIU) 219.

Instructions from I-Cache unit 208 may be outputted to Instruction Dispatch Unit (IDU) 209. IDU 209 may be configured to decode these received instructions. At this stage, the received instructions are primarily alternating from one thread to another. IDU 209 may further comprise an instruction sequencer 210 configured to forward the decoded instructions in an order determined by various algorithms. The out-of-order instructions may be forwarded to one of a plurality of issue queues 211 where a particular issue queue 211 may be coupled to one or more particular execution units, fixed point units 201, load/store units 203 and floating point units 202. Each execution unit may execute one or more instructions of a particular class of instructions. For example, FXUs 201 may execute fixed point mathematical and logic operations on source operands, such as adding, subtracting, ANDing, ORing and XORing. FPUs 202 may execute floating point operations on source operands, such as floating point multiplication and division. FXUs 201 may input their source and operand information from General Purpose Register (GPR) file 212 and output their results (destination operand information) of their operations for storage at selected entries in General Purpose rename buffers 213. Similarly, FPUs 202 may input their source and operand information from Floating Point Register (FPR) file 214 and output their results (destination operand information) of their operations for storage at selected entries in Floating Point (FP) rename buffers 215.

Processor 110 may dynamically share processor resources, such as execution units, among multiple threads by renaming and mapping unused registers to be available for executing an instruction. This may be accomplished by register renaming unit 216 coupled to IDU 209. Register renaming unit 216 may be configured to determine the registers from the register file, e.g., GPR file 212, FPR file 214, that will be used for temporarily storing values indicated in the instructions decoded by IDU 209.

As stated above, instructions may be queued in one of a plurality of issue queues 211. If an instruction contains a fixed point operation, then that instruction may be issued by an issue queue 211 to any of the multiple FXUs 201 to execute that instruction. Further, if an instruction contains a floating point operation, then that instruction may be issued by an issue queue 211 to any of the multiple FPUs 202 to execute that instruction.

All of the execution units, FXUs 201, FPUs 202, LSUs 203, may be coupled to completion unit 217. Upon executing the received instruction, the execution units, FXUs 201, FPUs 202, LSUs 203, may transmit an indication to completion unit 217 indicating the execution of the received instruction. This information may be stored in a table (not shown) which may then be forwarded to IFU 206. Completion unit 217 may further be coupled to IDU 209. IDU 209 may be configured to transmit to completion unit 217 the status information, e.g., type of instruction, associated thread, of the instructions being dispatched to issue queues 211. Completion unit 217 may further be configured to track the status of these instructions. For example, completion unit 217 may keep track of when these instructions have been "completed." An instruction may be said to be "completed" when it has executed and is at a stage where any exception will not cause the reissuance of this instruction. Completion unit 217 may further be coupled to issue queues 211 and further configured to transmit an indication of an instruction being completed to the appropriate issue queue 211 that issued the instruction that was completed.

LSUs 203 may be coupled to a data cache 218. In response to a load instruction, LSU 203 inputs information from data cache 218 and copies such information to selected ones of rename buffers 213, 215. If such information is not stored in data cache 218, then data cache 218 inputs through Bus Interface Unit (BIU) 219 such information from a system memory 220 connected to system bus 112 (see FIG. 1). Moreover, data cache 218 may be able to output through BIU 219 and system bus 112 information from data cache 218 to system memory 220 connected to system bus 112. In response to a store instruction, LSU 203 may input information from a selected one of GPR 212 and FPR 214 and copy such information to data cache 218.

LSU 203 may be coupled to a prefetch engine (not shown) configured to prefetch data from memory 220 prior to the time the data is requested by processor 110. The data prefetched from memory 220 may be speculatively prefetched based on the principle that if a memory location is addressed by processor 110, the next sequential address will likely be requested by processor 110 in the near future. This may be effected in software key instructions implemented therefore. Additionally, prefetches may be triggered by a miss in the data cache. For example, if there are two sequential cache misses, a prefetch, generated by hardware. (i.e., hardware prefetches) may be performed. The data prefetched may be loaded in data cache 218. The prefetch engine (not shown) may comprise a plurality of registers, referred to herein as "prefetch registers" (not shown). The prefetch registers may be configured to store information regarding prefetching data. A more detailed description of the prefetch engine and its interrelation with LSU 203, data cache 218 and memory 220 is provided further below in conjunction with FIG. 3.

It is noted that processor 110 may comprise any number of execution units, e.g., FXUs 201, FPUs 202, LSUs 203, any number of issue queues 211, program counters 201 representing threads, GPRs 212 and FPRs 214, and that processor 110 is not to be confined in scope to any one particular embodiment.

Figure 3:
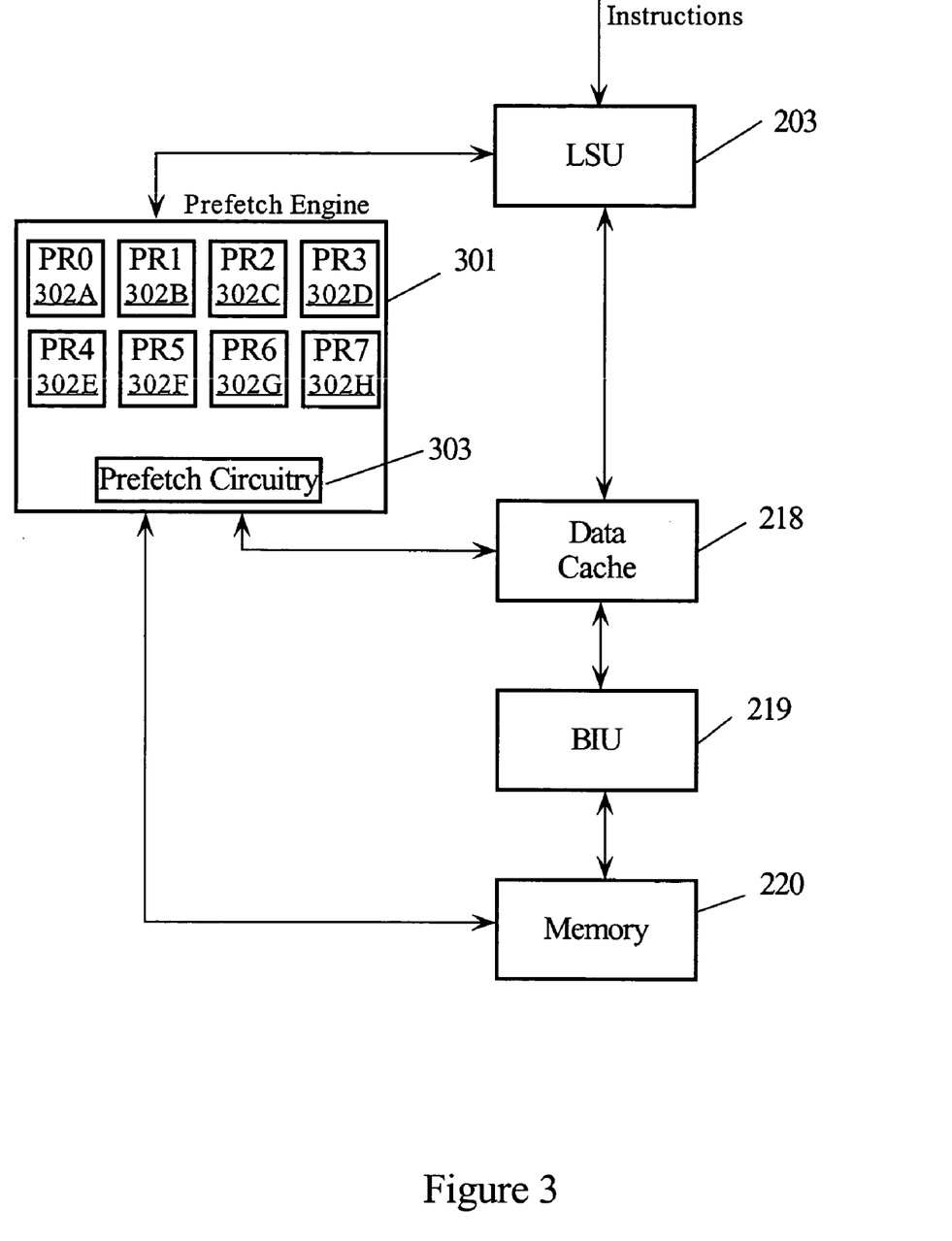
FIG. 3 illustrates an embodiment of the present invention of a prefetch engine.
Figure 4:
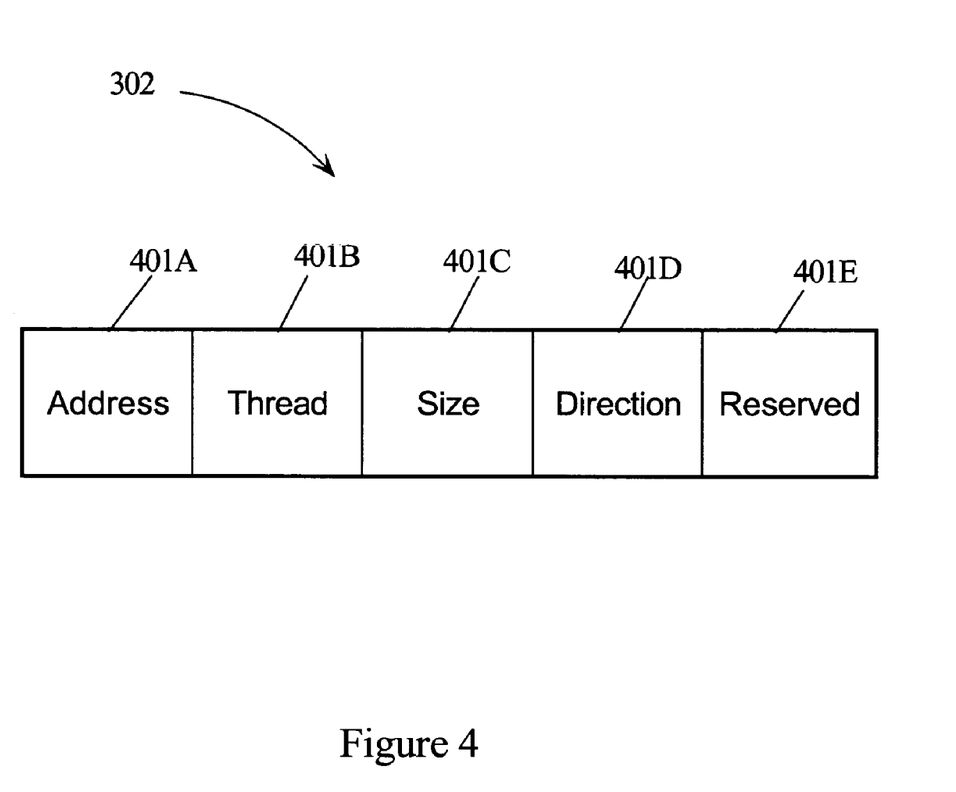
FIG. 4 illustrates an embodiment of the present invention of the fields of a prefetch register.
Figure 5:
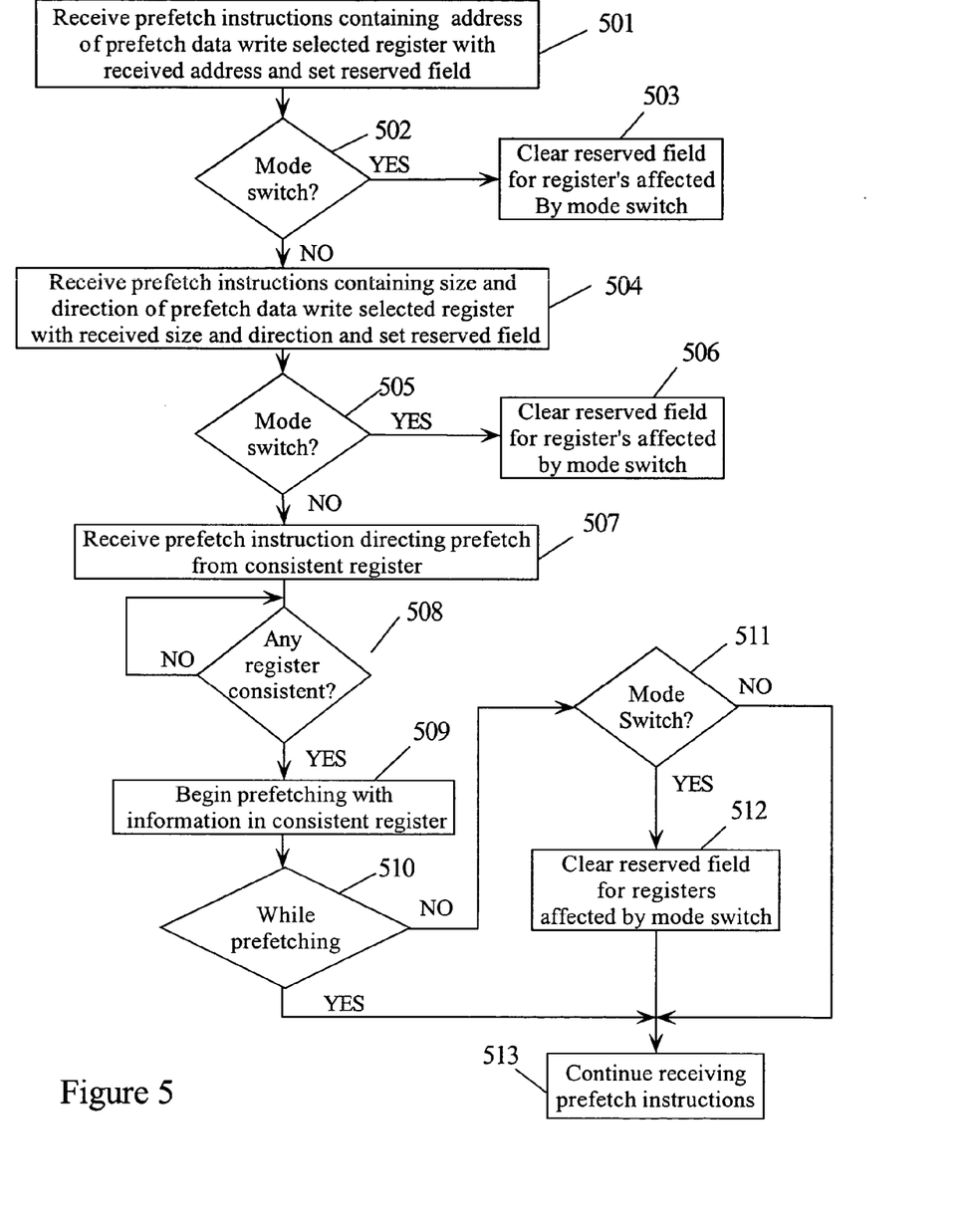
FIG. 5 is a flowchart of a method for dynamically reallocating prefetch registers upon switching modes of operation in accordance with an embodiment of the present invention.

As stated in the Background Information section, in a multithreading processor, prefetch instructions may be from multiple threads. If a particular prefetch instruction included information, e.g., address of the prefetched data, from a first thread, e.g., thread $T_0$, to be stored in a particular prefetch register and another prefetch instruction included information, e.g., size and direction of the prefetched data, from a second thread, e.g., thread $T_1$, to be stored in that same particular prefetch register, then undesirable results may occur such as prefetching the wrong data from main memory. That is, inconsistent data may be stored in a prefetch register when prefetch information from multiple threads are stored in the same prefetch register. Therefore, there is a need in the art to prevent at least in part inconsistent prefetch information from being stored in a prefetch register. This problem may be solved, at least in part, by partitioning the prefetch registers to be accessed by particular threads. That is, a first set of prefetch registers may be available to be used by one thread and a second set may be available to be used by another thread. A more detailed discussion of partitioning prefetch registers to be accessed by particular threads is described further below in conjunction with FIGS. 3–5. FIG. 3 illustrates an embodiment of the present invention of a prefetch engine comprising prefetch registers configured to store information for data prefetching. FIG. 4 illustrates an embodiment of the present invention of the fields of a prefetch register. FIG. 5 is a flowchart for dynamically reallocating prefetch registers upon switching modes of operation in accordance with an embodiment of the present invention.

The prefetch registers may be dynamically partitioned according to a particular mode of operation, e.g., single thread mode of operation, multithread mode of operation, in order to efficiently use all the resources (prefetch registers) available. For example, if there were eight prefetch registers (PR0–7) in the prefetch engine, then during a single thread mode of operation for thread $T_0$ where the processor executes instructions solely from thread $T_0$, prefetch registers PR0–7 may be available for use by thread $T_0$. Further, during a single thread mode of operation for thread $T_1$ where the processor executes instructions solely from thread $T_1$, prefetch registers PR0–7 may be available for use by thread $T_1$. Further, during a multithread mode of operation where the processor executes instructions for both threads $T_0$ and $T_1$, prefetch registers PR0–7 may be partitioned into two sets of prefetch registers in which one set is available to $T_0$ and the other to $T_1$. For example, prefetch registers PR0–3 may be a first set available to be used by thread $T_0$ and prefetch registers PR4–7 may be a second set available to be used by thread $T_1$. On switching from single thread mode to a multithread mode, in particular, the dynamic partitioning may give rise to a register "collision" wherein a prefetch register may contain an address from a first thread instruction $T_0$ say, and data from a prefetch instruction from a second thread, $T_1$, for example. This problem may be solved, at least in part, by the prefetch engine clearing a field, referred to herein as the "reserved field." By clearing the reserved field, the particular register may be invalidated. A more detailed discussion of clearing the reserved field during mode switches is described further below in conjunction with FIGS. 3–5.

FIG. 3—Prefetch Engine

FIG. 3 illustrates an embodiment of the present invention of a prefetch engine 301. Prefetch engine 301 may be coupled to load/store unit 203 (see FIG. 2), data cache 218 (see FIG. 2) and memory 220 (see FIG. 2). Load/store unit 203 may be coupled to data cache 218. Data cache 218 may be coupled to memory 220 via BIU 219 (see FIG. 2). Prefetch engine 301 may comprise a plurality of prefetch registers 302A–H designated as PR0–7. Prefetch registers 302A–H may collectively or individually be referred to as prefetch registers 302 or prefetch register 302, respectively. Prefetch registers 302 may be configured to store information for prefetching data from memory 220. Prefetch engine 301 may further comprise prefetch circuitry 303 configured to prefetch data from memory 220 using the information stored in prefetch registers 302. It is noted that prefetch engine 301 may comprise any number of prefetch registers 302 and that FIG. 3 is illustrative.

Load/store unit 203 may receive instructions, referred to herein as "prefetch instructions," configured to provide information, e.g., the address, size and direction of the prefetched data, regarding the prefetching of data. For example, one prefetch instruction may provide the address of where to prefetch the data in memory 220. Another prefetch instruction may provide the size and direction. The size may refer to the size of the contiguous block of data to be prefetched. The direction may refer to whether the contiguous block of data is to be prefetched from memory 220 at the address received in the prefetch instruction and upwards or at the address received in the prefetch instruction and downwards. Further, these prefetch instructions may specify a particular prefetch register 302 to insert the information contained in the instruction. Another prefetch instruction may indicate to prefetch engine 301 to prefetch the data from main memory using the information provided in a particular prefetch register 302.

In addition to storing information regarding the address, size and direction of the data to be prefetched in prefetch register 302, the thread associated with the data prefetch information as well as whether the prefetch register is to be reserved for that thread may be stored in prefetch register 302 as illustrated in FIG. 4. Referring to FIG. 4, FIG. 4 illustrates an embodiment of the present invention of the fields 401A–E in prefetch register 302. Fields 401A–E may collectively or individually be referred to as fields 401 or field 401, respectively. It is noted that prefetch register 302 may comprise additional or fewer fields 401 and that FIG. 4 is illustrative. It is further noted that prefetch register 302 may comprise fields 401 storing different information than illustrated where each field 401 may be any number of bits long.

Referring to FIG. 4, prefetch register 302 may comprise field 401A configured to store the address of where to prefetch the data in memory 220. Prefetch register 302 may further comprise field 401B configured to store a value indicating which thread, e.g., thread $T_0$, the prefetch data information is coming from. Further, prefetch register 302 may comprise field 401C configured to store information regarding the size of the contiguous block of data to be prefetched. Prefetch register 302 may further comprise field 401D configured to store the direction, e.g., upwards, downwards, to prefetch data from the received address indicating where to prefetch data in memory 220. Prefetch register 302 may further comprise field 401E configured to indicate whether prefetch register 302 is to be "reserved" based on a value stored in field 401E. As previously discussed, prefetches may be generated by software, via prefetch instructions in a software stream, or alternatively, by hardware. The "reserved" field may be set to "reserve" the particular register for software prefetches. In other words, if a software instruction is specified to a prefetch register that is not already reserved for software use, the prefetch engine, such as prefetch engine 301, FIG. 3, may clear the existing information in that register (e.g. hardware created stream), and write the new information into the register, reserving the register for software use. Prefetch register 302 may be reserved by a prefetch instruction setting a value in field 401E. Additionally, as previously mentioned, and discussed further below, the reserve field may be used to mitigate a register collision on a mode switch.

Referring to FIGS. 3 and 4, upon load/store unit 203 receiving from issue queue 211 a prefetch instruction containing an address in main memory 220 to prefetch data, load/store unit 203 may load the received address in field 401A in the appropriate prefetch register 302 based on the prefetch instruction. Upon load/store unit 203 receiving from issue queue 211 a prefetch instruction containing a size and direction of the prefetch data, load/store unit 203 may load fields 401C, 401D, respectively, in the appropriate prefetch register 302 based on the prefetch instruction.

Further, load/store unit 203 may load field 401B with a value indicating which thread, e.g., thread $T_0$, these prefetch instructions are from. That is, field 401B may be set to a value, e.g., logical value of "1" or zero, by load/store unit 203 indicating which thread the prefetch instructions received in steps 501, 503 are from. In one embodiment, load/store unit 203 may be configured to determine which thread the received prefetch instruction are from upon receiving the prefetch instructions described above from issue queue 211. Upon determining which thread these prefetch instructions are from, load/store unit 203 may load field 401B with the appropriate value to indicate the appropriate thread.

Further, load/store unit 203 may load field 401E with a value indicating if prefetch register 302 is to be reserved, i.e., designated for software prefetches. That is, field 401E may be set to a value, e.g., logical value of "1" or zero, by load/store unit 203 indicating if prefetch register 302 is to be reserved. In one embodiment, load/store unit 203 may load field 401E with a value indicating to reserve prefetch register 302 based on receiving a command (command to set field 401E in an identified prefetch register 302) from the prefetch instruction containing an address in main memory 220 and/or from the prefetch instruction containing a size and direction of the prefetch data.

Load/store unit 203 may further receive a prefetch instruction instructing prefetch engine 301 to prefetch data using the information in a designated prefetch register 302. In one embodiment, load/store unit 203 may instruct prefetch engine 301 to prefetch data using the information stored in a designated prefetch register, e.g., prefetch register 302A. The data may be prefetched from memory 220 and stored in data cache 218 by circuitry 303.

Processor 110 may operate in different modes of operation. One mode of operation may be referred to as a "single thread mode of operation." A single thread mode of operation may refer to processor 110 executing instructions from a particular thread, e.g., thread $T_0$ or thread $T_1$. Another mode of operation may be referred to as a "multithread mode of operation." A multithread mode of operation may refer to processor 110 executing instructions from multiple threads, e.g., threads $T_0$ and $T_1$.

Prefetch registers 302 may be dynamically partitioned according to the particular mode of operation in order to efficiently use all the resources (prefetch registers) available. For example, referring to FIG. 3, prefetch registers (PR0-7) 302A-H may be exclusively used for thread $T_0$ during a single thread mode of operation for thread $T_0$ where processor 110 executes instructions solely from thread $T_0$. Similarly, prefetch registers (PR0-7) 302A-H may be exclusively used for thread $T_1$ during a single thread mode of operation for thread $T_1$ where processor 110 executes instructions solely from thread $T_1$. During a multithread mode of operation where processor 110 executes instructions for both threads $T_0$ and $T_1$, prefetch registers (PR0-7) 302A-H may be allocated among both threads. For example, prefetch registers (PR0-3) 302A-D may be available to be used by thread $T_0$ and prefetch registers (PR4-7) 302E-H may be available to be used by thread $T_1$. In other words, as described above, prefetch registers may be partitioned into two sets, each set available for use by a corresponding one of the threads. It is noted that prefetch registers 302 may be allocated in any manner among multiple threads during the multithread mode of operation.

As stated above, prefetch registers 302 may be reserved to be used for software prefetches. For example, a prefetch instruction may instruct load/store unit 203 to indicate in field 401E of prefetch register 302A that prefetch register 302A is to be reserved for software prefetch use. If processor 110 is operating in single thread mode of operation and the mode of operation for processor 110 switches to multithread mode of operation, then prefetch registers 302A–302H may be dynamically partitioned as described above. During the single thread mode of operation for thread for example, $T_0$, each prefetch register 302A-H may be allocated to be used for thread $T_0$. During the multithread mode of operation, prefetch register 302A may be allocated to be used for thread $T_1$. On switching of the mode, prefetch register 302A may contain, for example, an address set by thread $T_0$. If thread $T_1$ loads data into register 302A, a collision has occurred.

This problem may be solved, at least in part, by prefetch engine 301 invalidating, upon a switch in the mode of operation of processor 110, such prefetch registers as are to be dynamically partitioned.

A method for dynamically reallocating prefetch registers 302 upon switching modes of operation is described below in conjunction with FIG. 5.

FIG. 5—Method for Dynamically Reallocating Prefetch Registers Upon Switching Modes of Operation FIG. 5 is a flowchart of one embodiment of the present invention of a method 500 for dynamically reallocating prefetch registers 302 (see FIGS. 3–4) upon processor 110 (see FIG. 2) switching modes of operation.

Referring to FIG. 5, in conjunction with FIGS. 3–4, in block 501, load/store unit 203 receives a prefetch instruction from issue queue 211 from a particular thread, e.g., thread $T_1$, containing an address in main memory 220 to prefetch data. The received address, as well as the source thread, is written to a selected prefetch register. The selected prefetch register depends on the register specified by the instruction, the mode of operation (single threaded or multithreaded) and the ID of the thread (0 or 1, for example). A register ID defined in the instruction may be remapped to a physical register having a different ID, corresponding to the set of prefetch registers available to the thread, as discussed above. For example a register ID of 2 defined in the instruction may be mapped to the physical register with an ID of 6. Additionally, in step 501, the reserved field in the selected register is set, marking the register as reserved for software use.

If a mode switch occurs, block 502, the prefetch engine will clear the reserved field of the registers affected by the mode switch, block 503. Table I shows which registers are cleared across the various mode switches, in an exemplary embodiment of the present invention. If the reserved bits for the appropriate registers were not cleared at this time, any partially specified prefetch information could remain in the prefetch register, to be paired with prefetch information from a different thread, causing inconsistent prefetch streams to be created.

TABLE I

ST to ST switch

T0 --> T1: All 8 entries PR0–PR7 are unreserved and made available to T1 as logical stream numbers PR4–7,PR0–3.
T1 --> T0: All 8 entries PR0–PR7 are unreserved and made available to T0 as logical stream numbersPR0–PR7.

ST to SMT switch

T0 --> T0 + T1: PR4–PR7 are unreserved and made available to T1 as logical stream numbers PR0 through PR3.
T1 --> T0 + T1: PR0–PR3 are unreserved and made available to T0 as logical stream numbers PR0 through PR3.

SMT to ST switch

T0 + T1 --> T0: PR4–PR7 are unreserved and made available to T0 as logical stream numbers PR4–PR7.
T0 + T1 --> T1: PR0–PR3 are unreserved and made available to T1 as logical stream numbers PR4–PR7.

In block 504, the load/store unit receives a prefetch instruction from a particular thread containing the size and direction of prefetch data. Similarly to block 501, based on the thread mode of the processor, the prefetch engine may alter the prefetch register ID defined by the instruction. For example, if the thread sourcing the instruction is thread 1 and the prefetch register is defined to have an ID of 2, the physical prefetch register chosen may have an ID of 6. Alternatively, if the thread sourcing the instruction is thread 0 and the prefetch register is defined, using the same example, to have an ID of 2, the physical prefetch register chosen may have an ID of 2. That prefetch register is then written with the received size and direction of prefetch data, as well as source thread. Additionally, the reserved field for the register is set, marking that prefetch register as reserved for software use.

If a mode switch occurs, block 505, similarly to block 503, the prefetch engine will clear the reserved field of the registers affected by the mode switch, block 506. The reserved bits for the appropriate registers are cleared to prevent inconsistent prefetch streams from being created.

A prefetch may not occur until at least one register is consistent, that is contains address and size/direction fields from the same thread. In block 507 a prefetch instruction is received directing the prefetch engine to prefetch memory from any consistent register. If a register is consistent, block 508, that register will begin prefetching with that information, block 509. While a prefetch register is prefetching from memory, block 510, the processor may switch thread mode. If, the mode switches, block 511, this will cause the prefetch engine to clear the reserved fields as previously described, block 512. Otherwise, in block 513, the prefetch engine continues to receive and process prefetch instructions in accordance with the previously described blocks 501–512.

It is noted that method 500 may include other and/or additional steps that, for clarity, are not depicted. It is further noted that method 500 may be executed in a different order from the order presented and that the order presented in the discussion of FIG. 5 is illustrative. For example, steps 504–506 may be executed prior to step 501.

Although the method and multithreaded processor are described in connection with several embodiments, it is not intended to be limited to the specific forms set forth herein, but on the contrary, it is intended to cover such alternatives, modifications and equivalents, as can be reasonably included within the spirit and scope of the invention as defined by the appended claims. It is noted that the headings are used only for organizational purposes and not meant to limit the scope of the description or claims.

The invention claimed is:

1. An apparatus, comprising:
   a prefetch engine comprising a plurality of prefetch registers; and
   an execution unit coupled to said prefetch engine, wherein said execution unit is configured to receive prefetch instructions regarding prefetching data, wherein said execution unit is configured to load said plurality of prefetch registers with prefetch information obtained from said prefetch instructions;
   wherein each of said plurality of prefetch registers is available for storing said prefetch information for a first thread in a single thread mode of operation and said plurality of prefetch registers is partitioned in a first set of prefetch registers and a second set of prefetch registers in a multithread mode of operation, said first set of prefetch registers available to a predetermined one of said first thread and a second thread and said second set of prefetch registers available to a remaining one of said first thread and a second thread; and
   wherein a first prefetch register includes a first field configured to indicate whether said first prefetch register is reserved to be accessed by a software prefetch;
   wherein said execution unit comprises:
      logic for loading said first prefetch register with information regarding prefetching data for said first thread;
   wherein said first prefetch register comprises a second field configured to indicate which thread of said first and said second threads is accessing said first prefetch register, wherein a value in said first field is set to a first predetermined value to indicate said first prefetch register is reserved for a software prefetch and a value in said second field is set to a second predetermined value to indicate said first prefetch register is accessed by said first thread;
   and wherein said prefetch engine further comprises logic for clearing said value in said first field in said first prefetch register upon a switch of said single thread mode of operation to said multithread mode of operation or vice-versa.

2. The apparatus as recited in claim 1, wherein in said multithread mode of operation said plurality of prefetch registers are allocated equally among said first set of prefetch registers and said second set of prefetch registers.

3. The apparatus as recited in claim 1 further comprises:
   a data cache coupled to said execution unit and to said prefetch engine; and
   a memory unit coupled to said data cache;
   wherein said prefetch engine is configured to prefetch data from said memory unit using said prefetch information stored in said plurality of prefetch registers, wherein said prefetch engine is further configured to store prefetched data in said data cache.

4. The apparatus as recited in claim 1, wherein said first prefetch register is invalidated in response to said clearing said value in said first prefetch register.

5. A multithreaded processor, comprising:
   a program counter;
   an instruction fetch unit coupled to said program counter, wherein said instruction fetch unit is configured to retrieve instructions from said program counter, wherein said retrieved instructions comprises prefetch instructions, wherein, in a single thread mode of operation, said instruction fetch unit is configured to retrieve instructions from said program counter for one of a first thread and a second thread, wherein, in a multithread mode of operation, said instruction fetch unit is configured to retrieve instructions for both said first thread and said second thread;

an instruction dispatch unit coupled to said instruction fetch unit, wherein said instruction dispatch unit is configured to decode said retrieved instructions;

a queue coupled to said instruction dispatch unit, wherein said instruction dispatch unit is further configured to dispatch said decoded instructions to said queue;

an execution unit coupled to said queue, wherein said execution unit is configured to receive prefetch instructions issued from said queue; and a prefetch engine coupled to said execution unit, said execution unit coupled to said prefetch engine, wherein said execution unit is configured to receive prefetch instructions regarding prefetching data, wherein said execution unit is configured to load said plurality of prefetch registers with prefetch information obtained from said prefetch instructions;

wherein each of said plurality of prefetch registers is available for storing said prefetch information for a first thread in a single thread mode of operation and said plurality of prefetch registers is partitioned in a first set of prefetch registers and a second set of prefetch registers in a multithread mode of operation, said first set of prefetch registers available to a predetermined one of said first thread and a second thread and said second set of prefetch registers available to a remaining one of said first thread and a second thread; and wherein a first prefetch register includes a first field configured to indicate whether said first prefetch register is reserved to be accessed by a software prefetch;

wherein said multithreaded processor operates under one of said single thread mode of operation and said multithread mode of operation, wherein said execution unit comprises:

logic for loading said first prefetch register with information regarding prefetching data for said first thread;

wherein said first prefetch register comprises a second field configured to indicate which thread of said first and said second threads is accessing said first prefetch register, wherein a value in said first field is set to a first predetermined value to indicate said first prefetch register is reserved for a software prefetch and a value in said second field is set to a second predetermined value to indicate said first prefetch register is accessed by said first thread;

and wherein said prefetch engine further comprises logic for clearing said value in said first field in said first prefetch register upon a switch of said single thread mode of operation to said multithread mode of operation or vice-versa.

6. The multithreaded processor as recited in claim 5, wherein in said multithread mode of operation said plurality of prefetch registers are allocated equally among said first set of prefetch registers and said second set of prefetch registers.

7. The multithreaded processor as recited in claim 5 further comprises:

a data cache coupled to said load/store unit and to said prefetch engine; and a memory unit coupled to said data cache;

wherein said prefetch engine is configured to prefetch data from said memory unit using said prefetch information stored in said plurality of prefetch registers, wherein said prefetch engine is further configured to store prefetched data in said data cache.

8. The multithreaded processor as recited in claim 5, wherein said first prefetch register is invalidated in response to said clearing said value in said first prefetch register.

* * * * *